I. REXFORD.
Seed Planter.
No. 84,762.  Patented Dec. 8, 1868.
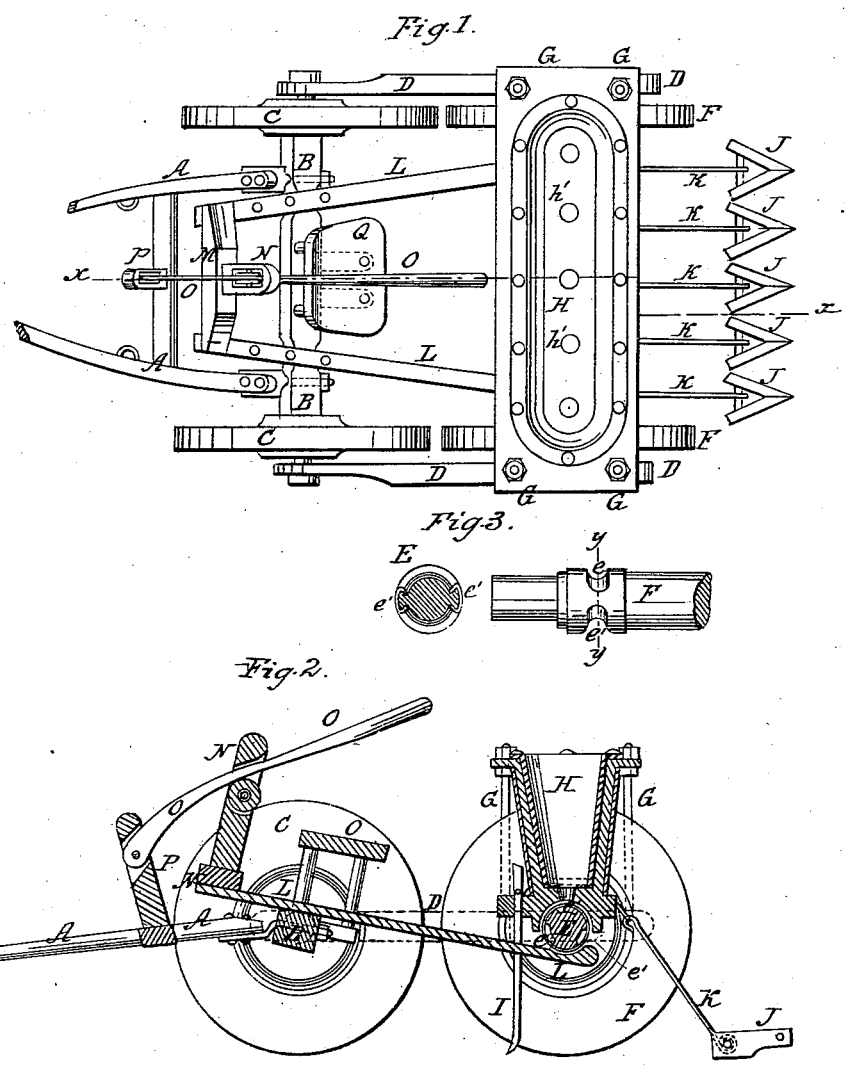

ISAAC REXFORD, OF MALONE, NEW YORK.

Letters Patent No. 84,762, dated December 8, 1868.

IMPROVEMENT IN SEED-PLANTERS.

The Schedule referred to in these Letters Patent and making part of the same.

*To all whom it may concern:*

Be it known that I, ISAAC REXFORD, of Malone, in the county of Franklin, and State of New York, have invented a new and useful Improvement in Seed-Planters; and I do hereby declare that the following is a full, clear, and exact description thereof, which will enable others skilled in the art to make and use the same, reference being had to the accompanying drawings, forming part of this specification, in which—

Figure 1 is a top or plan view of my improved seed-planter.

Figure 2 is a detail sectional view of the same, taken through the line x x, fig. 1.

Figure 3 represents detail views of the dropping-cylinder.

Similar letters of reference indicate like parts.

My invention has for its object to furnish an improved seed-planter, simple in construction, effective and convenient in operation, doing its work accurately and well, and which may be easily adjusted to various kinds of seeds; and It consists in the construction and combination of the various parts, as hereinafter more fully described.

A are the shafts, which are rigidly attached to the forward axle B, upon which the wheels C revolve in the ordinary manner.

D are side-bars, the forward ends of which are pivoted to the ends of the axle B, and in the rear parts of which are formed bearings for the journals of the dropping-cylinder E, to the ends of which the wheels F are rigidly attached, so that the said cylinder E may be revolved by the revolution of the said wheels F.

In the face of the cylinder E are formed recesses or cavities, $e'$, of such a size as to contain the exact amount of seed for a hill, and which cavities or recesses are so arranged that the hills of each row, and the rows themselves, may be at the desired distance apart.

Sets of cylinders E should be prepared, having recesses or cavities $e'$, of a form and size required for planting different kinds of seeds, so that the machine may be adjusted for planting different kinds of seed, by simply exchanging the cylinder E that may be in the machine, for one having cavities or recesses $e'$ of the requisite size.

G are rods, the lower ends of which are attached to the rear parts of the side-bars D, and to the upper ends of which the seed-box or hopper H is adjustably secured by nuts, as shown in fig. 2.

The seed-box H may be made of any desired capacity, and is formed with holes, $h'$, in its bottom, directly over the cavities or recesses $e'$ in the cylinder E, so that the seed may flow from said seed-box into said cavities $e'$, by which it is dropped to the ground. The under side of the bottom of the seed-box is hollowed out, or made concave, so as to fit upon the cylinder E with sufficient closeness to prevent the escape of the seed otherwise than through the cavities $e'$.

I are markers, the shanks of which are adjustably attached to the seed-box H, so that they may be raised or lowered as required to adjust them to open furrows of the proper depth to receive the seed, according to the depth in the ground at which the seed being planted requires to be placed.

The shanks of the markers I pass up through the projecting forward edge of the bottom of the seed-box H, where they may be adjustably secured in place by a pin or pins passing through one or the other of the holes through said shanks, or, if desired, the said markers may be secured by bolts and hand-nuts passing through slots in said shanks.

J are the coverers, each of which is formed of two side-bars, meeting and secured to each other at an angle at their rear ends, and the forward ends of which are connected and held in their proper relative position by a connecting-bar, as shown in fig. 1.

Each of the coverers J is connected to the seed-box H by the draught-bar or chain K, in such a position that the coverers J may fill up the furrows opened by the markers I, covering the seed to the required depth.

L are levers, which ride upon the forward axle B, upon which they are kept in position by pins passing through the said levers, upon each side of the axle B, several holes being formed through the said levers for the reception of the said pins, so that the leverage may be adjusted as required.

The forward ends of the levers L are connected by a cross-bar, M, to the middle part of which is securely attached the lower end of the standard N.

The upper part of the standard N is slotted to receive the lever O, and should be provided with a friction-wheel to diminish the friction in operating said lever O.

The forward end of the lever O is pivoted to the upper end of the standard P, the lower end of which is rigidly attached to the cross-bar of the thills A.

The rear ends of the levers L extend back beneath the dropping-cylinder E and seed-box H, so that the driver, by operating the lever O, may raise the rear part of the machine away from the ground for convenience in turning, and to prevent the dropping-device from operating while turning, or while passing from place to place.

Q is the driver's seat, which is connected with and supported by the forward axle B, as shown in figs. 1 and 2.

Having thus described my invention,

I claim as new, and desire to secure by Letters Patent—

1. The combination of the side-bars D, bars or supports G, seed-box H, dropping-cylinder E, and wheels F, with each other, and with the forward axle B, said parts being constructed and operating substantially as herein shown and described, and for the purposes set forth.

2. The coverers J, constructed as described, and draught-bars or chains K, in combination with the seed-box H, substantially as and for the purpose specified.

3. The combination of the levers L, cross-bar M, standard N, lever O, and standard P, with each other, with the cross-bar of the thills A, forward axle B, dropping-cylinder E, and seed-box H, substantially as herein shown and described, and for the purpose set forth.

The above specification of my invention signed by me, this 17th day of February, 1868.

ISAAC REXFORD.

Witnesses:
F. P. ALLEN,
C. W. BOND.